(12) United States Patent
Ueura et al.

(10) Patent No.: US 9,333,952 B2
(45) Date of Patent: May 10, 2016

(54) VEHICLE BRAKE SYSTEM

(71) Applicant: HONDA MOTOR CO., LTD., Minato-Ku, Tokyo (JP)

(72) Inventors: Soichiro Ueura, Wako (JP); Kazuharu Kidera, Wako (JP); Takashi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/505,063

(22) Filed: Oct. 2, 2014

(65) Prior Publication Data

US 2015/0097416 A1 Apr. 9, 2015

(30) Foreign Application Priority Data

Oct. 4, 2013 (JP) ................................ 2013-208821

(51) Int. Cl.
*B60T 13/16* (2006.01)
*B60T 7/04* (2006.01)
*B60T 11/10* (2006.01)
*B60T 13/66* (2006.01)
*B60T 13/68* (2006.01)
*B60T 13/74* (2006.01)

(52) U.S. Cl.
CPC ............... *B60T 7/042* (2013.01); *B60T 11/103* (2013.01); *B60T 13/662* (2013.01); *B60T 13/686* (2013.01); *B60T 13/745* (2013.01)

(58) Field of Classification Search
CPC ........ B60T 7/42; B60T 11/103; B60T 8/4081
USPC ............................ 303/3, 15, 20, 114.1, 115.2
See application file for complete search history.

(56) References Cited

U.S. PATENT DOCUMENTS

2012/0151914 A1* 6/2012 Nishioka ................ B60T 7/042
60/545
2012/0193975 A1* 8/2012 Ishii ...................... B60T 8/4081
303/14
2013/0270895 A1* 10/2013 Nishioka ................ B60T 7/042
303/14

FOREIGN PATENT DOCUMENTS

JP 2009-227023 A 10/2009

* cited by examiner

*Primary Examiner* — Christopher Schwartz
(74) *Attorney, Agent, or Firm* — Carrier Blackman & Associates, P.C.; William D. Blackman; Joseph P. Carrier

(57) ABSTRACT

In a brake-by-wire brake system which includes a motor actuated cylinder configured to produce a brake fluid pressure according to an operating stroke thereof and an electric motor for actuating the motor actuated cylinder, the control mode is normally based on a fluid pressure control, but is switched to a stroke control when the brake pedal is released for the purpose of quickly reducing the operating stroke of the motor actuated cylinder to an initial value. To avoid a sudden increase in the noises of the electric motor at the time of switching from the fluid pressure control to the stroke control, a limit circuit limits electric current supplied to the electric motor when the control mode is switched from the fluid pressure control to the stroke control.

8 Claims, 5 Drawing Sheets

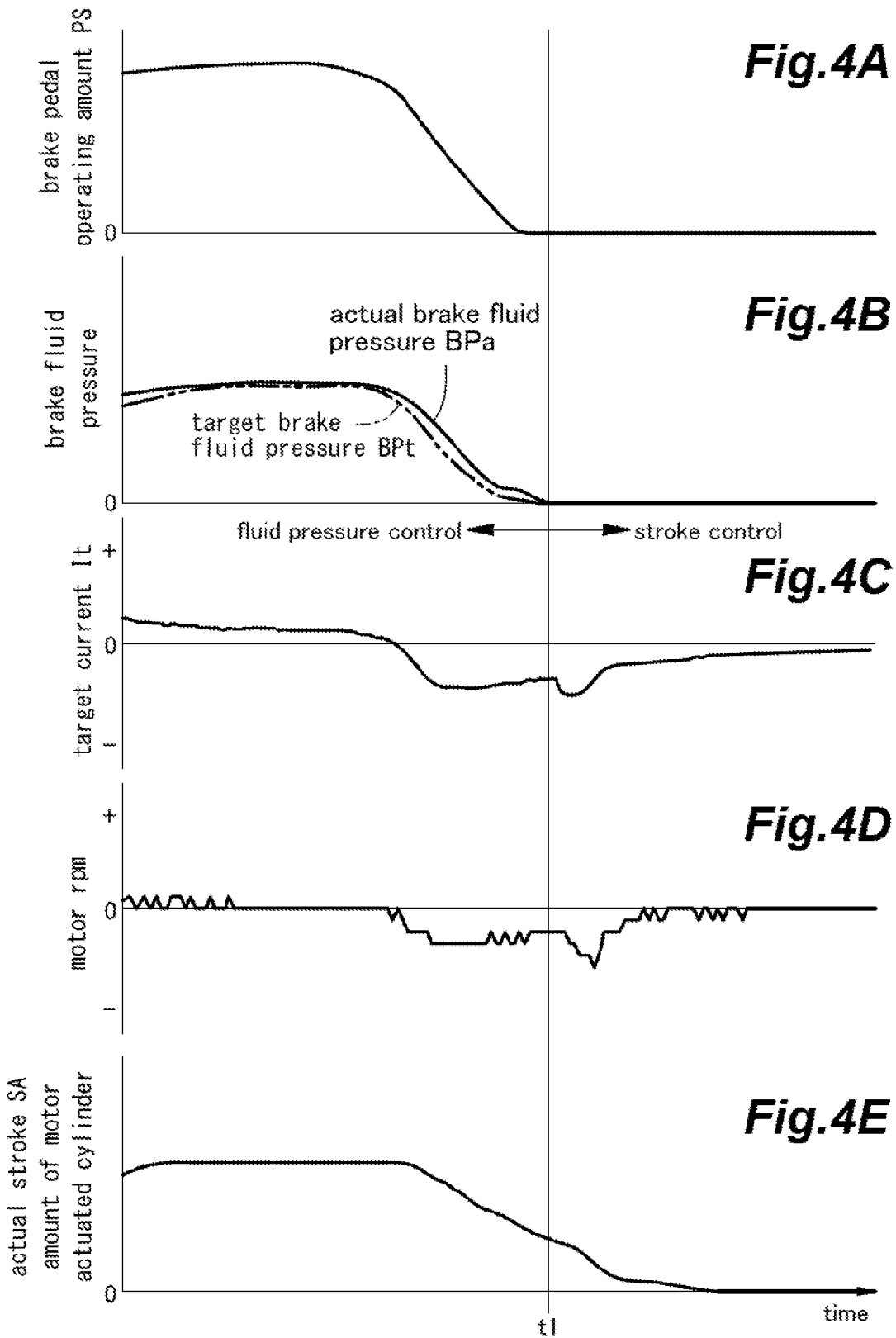

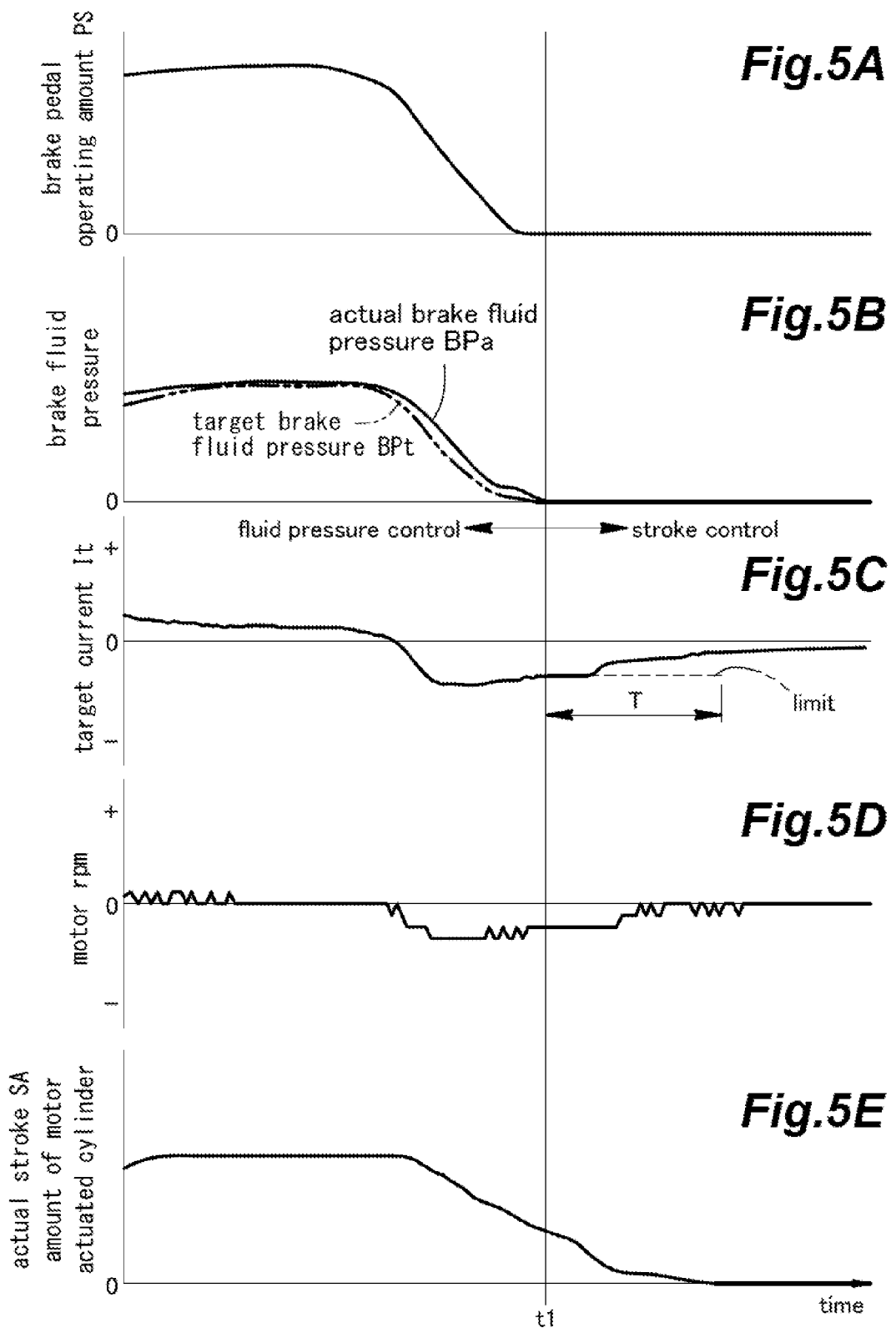

VEHICLE BRAKE SYSTEM

TECHNICAL FIELD

The present invention relates to a vehicle brake system consisting of a brake-by-wire system which can control the brake force of the vehicle independently from the braking operation performed by a vehicle operator when necessary.

PRIOR ART

In some of the known brake systems, a normal braking using a frictional brake device and a regenerative braking using a motor/generator are combined in a coordinated manner under the control of an electronic control unit so that an optimum braking operation may be performed without relying on the active intervention of a vehicle operator. See JP2009-227023, for instance. Such a brake system is typically equipped with a motor actuated tandem cylinder incorporated with a pedal simulator which simulates a pedal reaction, and is often combined with an ABS hydraulic system and/or a VSA hydraulic system.

The control unit of such a brake system is configured to set a target brake fluid pressure which corresponds to the pedal stroke caused by the vehicle operator, and sets a target stroke of the motor actuated cylinder according to a fluid pressure vs motor actuated cylinder stroke map which takes into account the load vs fluid pressure loss property of the brake system. The control unit converts the target stroke into a target motor angular output, and controls the electric current that is supplied to the motor actuated cylinder by a feedback control for the motor angular output so that the fluid pressure commanded by the vehicle operator may be produced in the wheel cylinders.

The control unit of the brake system is also configured to ensure the actual brake fluid pressure to be appropriately corrected when any change occurs to the load vs fluid pressure property by performing a target brake fluid pressure compensation in which the target brake fluid pressure is corrected by adding the deviation of the actual brake fluid pressure from the target brake fluid pressure to the target brake fluid pressure or by performing a fluid pressure control in which the electric power supplied to the motor actuated cylinder is controlled by a feedback control based on the deviation of the actual brake fluid pressure from the target brake fluid pressure. It is also known to use a stroke control based on the deviation of the actual stroke of the motor actuated cylinder from the target stroke. However, the fluid pressure control is preferred over the stroke control because of an improved control accuracy and the simplicity of the overall control structure.

In the electronically controlled brake system of this type, the brake pedal operating amount vs. target brake fluid pressure map that is used for computing the target brake fluid pressure for each given brake pedal operating amount is configured such that a braking impression similar to that of the conventional brake system in which the fluid pressure created in the master cylinder with the aid of a vacuum booster is directly transmitted to the wheel cylinders may be achieved. For this purpose, the brake pedal operating amount vs. target brake fluid pressure map is designed so that the pedal pressure vs. brake force property of the conventional vehicle may be achieved for the given brake pedal operating amount vs. pedal pressure property and the brake fluid pressure vs. brake force property of the particular vehicle.

When the control unit of the electronically controlled brake system is given with properties similar to those of the conventional brake system, the releasing of the brake pedal may not cause the stroke of the motor actuated cylinder to return to the initial value owing to the hysteresis in the brake fluid pressure that may exist in the electronically controlled brake system based on the fluid pressure control. This may be overcome by using the stroke control, instead of the fluid pressure control, as the control principle for the brake system.

This however may prevent the desired accuracy in the brake control to be obtained. This problem can be overcome by switching the control principle for the motor actuated cylinder from the fluid pressure control to the stroke control when the brake pedal is released to reduce the fluid brake pressure to the initial value or a value close to zero so that the stroke of the motor actuated cylinder may be returned to the initial value in a more direct way.

However, when such a switching action from the fluid pressure control to the stroke control is performed, the electric power supplied to the motor actuated cylinder experiences such a rapid change that the resulting rapid change in the rotational speed of the electric motor for actuating the motor actuated cylinder may cause annoyance to the vehicle occupants.

SUMMARY OF THE INVENTION

In view of such problems of the prior art, a primary object of the present invention is to provide a vehicle brake system which is based on the fluid pressure control but allows the actual brake fluid pressure to return to the initial value as soon as the brake pedal is released.

A second object of the present invention is to provide a vehicle brake system which is usually based on the fluid pressure control but can switch to the stroke control when the brake pedal is released, and allows this transition from the fluid pressure control to the stroke control to be performed without causing any discomfort to the vehicle occupants.

According to the present invention, such objects can be accomplished by providing a vehicle brake system, comprising a power actuated fluid pressure source configured to produce a brake fluid pressure according to an operating stroke thereof; a power source for actuating the fluid pressure source; a brake unit actuated by the brake fluid pressure produced by the power actuated fluid pressure source; a stroke sensor for detecting the actual operating stroke of the power actuated fluid pressure source; a brake fluid pressure sensor for detecting an actual brake fluid pressure supplied to the brake unit; a brake pedal sensor for detecting a pedal stroke of the brake pedal; a target brake fluid pressure setting unit for setting a target brake fluid pressure according to the pedal stroke detected by the brake pedal sensor; a first control unit for setting a target operating stroke of the power actuated fluid pressure source for the given target brake fluid pressure, and controlling the power source for actuating the fluid pressure source according to a deviation of the actual operating stroke of the power actuated fluid pressure source from the target operating stroke thereof; a second control unit for controlling the power source for actuating the power actuated pressure source according to a deviation of the actual brake fluid pressure detected by the brake fluid pressure sensor from the target brake fluid pressure set by the target brake fluid pressure setting unit; and a control switch unit that selects the first control unit when the brake pedal is released and otherwise selects the second control unit.

According to this vehicle brake system, a highly accurate brake control can be achieved under most conditions by selecting the fluid pressure control performed by the second control unit, and the control mode is switched to the stroke control performed by the first control unit so that the actual brake fluid pressure may be returned to the initial value as soon as the brake pedal is released. The releasing of the brake pedal may be detected when the actual brake fluid pressure has dropped to a substantially zero level. Alternatively, the releasing of the brake pedal may be detected from the pedal stroke of the brake pedal.

In particular, the vehicle brake system may further comprise a limit circuit for limiting power supplied by the power source at least for a certain time period following the releasing of the brake pedal. Thereby, any sudden increase in the noises from the power source can be avoided at the time of transition from the fluid pressure control to the stroke control, and the vehicle occupants are prevented from being annoyed by such an increase in the noises.

Typically, the limit circuit limits an upper limit of an absolute value of power supplied by the power source when the power supplied by the power source is negative in sign. Thereby, the noises at the time of transition can be avoided while the responsiveness of the system can be ensured in other times.

Preferably, the limit circuit is configured to limit power supplied by the power source until the actual operating stroke of the power actuated fluid pressure source has substantially dropped to zero. Thereby, the noises at the time of transition can be prevented in a reliable manner.

According to a preferred embodiment of the present invention, the limit circuit limits the power supplied by the power source to a level of power that was supplied by the power source under a control of the second control unit immediately before the control switch unit selected the first control unit instead of the second control unit.

Thereby, the noises of the power source are prevented from increasing at the time of transition by limiting of the power supplied by the power source by the least possible amount so that the noises can be prevented with a minimum reduction in the responsiveness of the system.

The control switch unit may switch from the first control unit back to the second control unit when the actual stroke of the power actuated fluid pressure source has become substantially greater than zero.

Thereby, as soon as the actual stroke of the power actuated fluid pressure source has become substantially greater than zero, the control switch unit may switch from the first control unit back to the second control unit so that the fluid pressure control can be regained without any undue delay.

According to a particularly preferred embodiment of the present invention, the power source consists of an electric motor, and the power supplied to the electric motor is measured by a level of electric power or a duty ratio of electric power supplied to the electric motor. However, the power source is not limited to the electric motor, but may consist of any mechanical, hydraulic or other forms of power sources without departing from the spirit of the present invention.

Thus, according to the present invention, the actual stroke of the power actuated fluid pressure source can be reduced to the initial value by the stroke control as soon as the brake pedal is released while the benefits of the fluid pressure control can be obtained under normal conditions.

BRIEF DESCRIPTION OF THE DRAWINGS

Now the present invention is described in the following with reference to the appended drawings, in which:

FIGS. 4A-4E are time charts showing the mode of operation of the vehicle brake system without a limit circuit; and FIGS. 5A-5E are time charts showing the mode of the operation of the vehicle brake system with a limit circuit.

DESCRIPTION OF THE PREFERRED EMBODIMENT(S)

Figure 1:
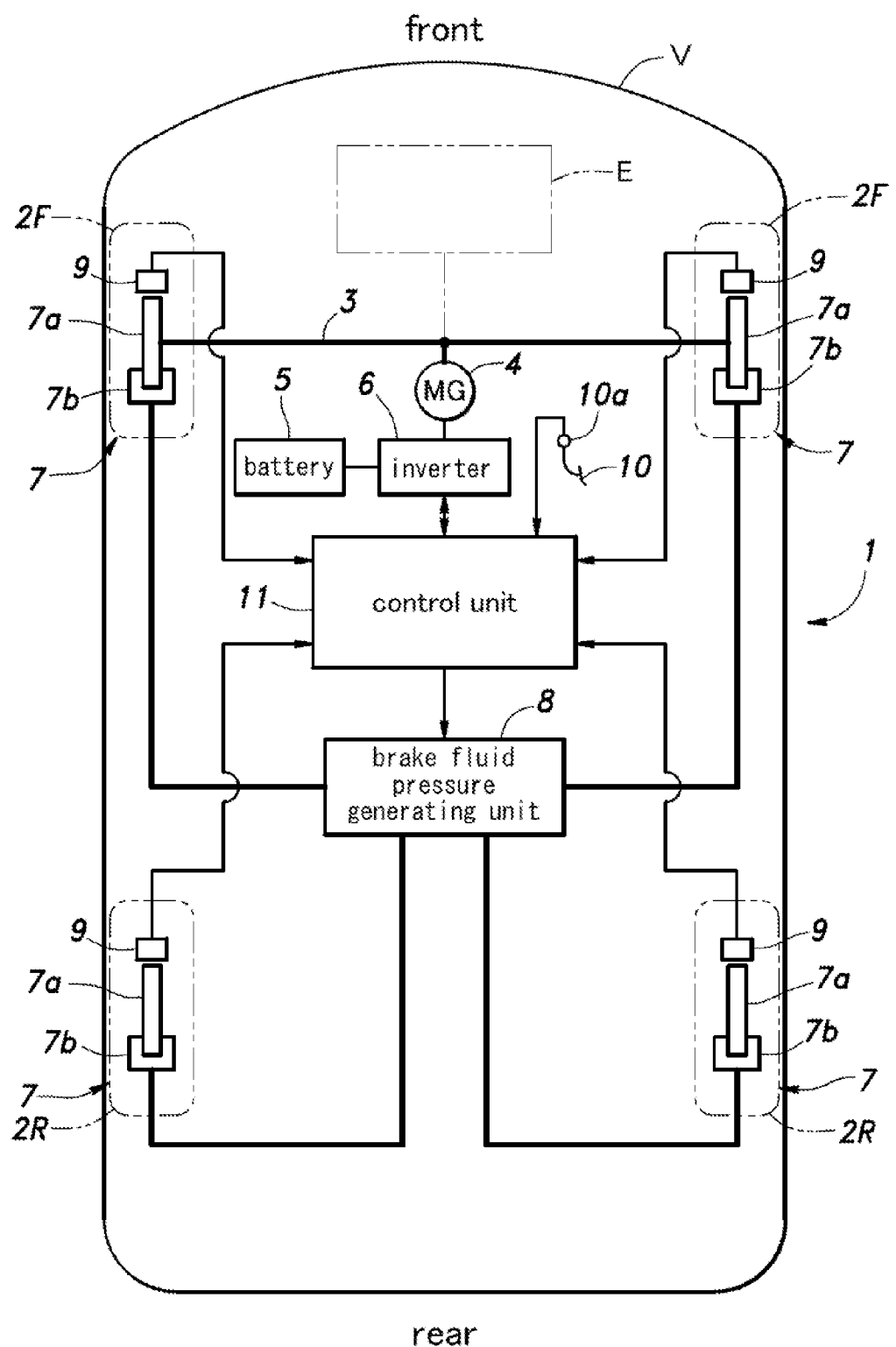
FIG. 1 is a schematic diagram showing a vehicle incorporated with a vehicle brake system embodying the present invention.

FIG. 1 shows a brake system of an electric or hybrid vehicle embodying the present invention. This vehicle V comprises a pair of front wheels 2F located on the front side thereof and a pair of rear wheels 2R located on the rear side thereof. The front wheels 2F are connected to a front axle 3 which is in turn connected to a motor/generator 4 in a torque transmitting relationship via a differential gear device (not shown in the drawing). In the illustrated embodiment, the vehicle V consists of a front drive vehicle, but the present invention is equally applicable to a rear drive vehicle or a four wheel drive vehicle by using a motor/generator for driving the rear wheels 2R.

The motor/generator 4 operates both as an electric motor for propelling the vehicle and a generator for providing a regenerative braking. More specifically, the motor/generator 4 can receive electric power from a rechargeable battery 5 serving as a power source via an inverter 6, and can also supply electric power to the battery 5 to recharge it by converting the kinetic energy into electric power by regenerative braking.

Each of the front and rear wheels 2F, 2R is provided with a per se known disk brake 7 including a disk 7a integrally attached to the wheel 2 (2F, 2R) and a caliper incorporated with a wheel cylinder 7b. The wheel cylinder 7b is connected to a brake fluid pressure generating unit 8 via brake tubing in a per se known manner. The brake fluid pressure generating unit 8 consists of a hydraulic circuit configured to distribute hydraulic brake fluid pressure to the different wheels and adjust the hydraulic brake fluid pressure level for each wheel as will be described hereinafter.

A wheel speed sensor 9 is provided in association with each wheel 2, and a displacement sensor (pedal sensor) 10a is provided in association with a brake pedal 10 (that is operated by a vehicle operator) to detect a brake pedal operating amount or a brake depression stroke.

The vehicle V is provided with a control unit 11 incorporated with a CPU control circuit which performs various control functions for the vehicle V including the distribution of the brake force as will be described hereinafter. The control unit 11 is electrically connected to the inverter 6, and receives detection signals from the wheel speed sensors 9 and the pedal stroke sensor 10a. In the case of an electric vehicle, the structure illustrated in FIG. 1 may be applied as it is, or, alternatively, an additional motor/generator for the rear wheels 3 may be included in the vehicle 1. In the case of a hybrid vehicle, the front axle 4 is additionally connected to the output shaft of an internal combustion engine E indicated by an imaginary line box in FIG. 1.

Upon detecting an output signal of the displacement sensor 10a of the brake pedal 10 becoming greater than an initial value (=0), the control unit 11 performs a control action for braking. In the illustrated embodiment, the braking action is performed as that of a brake-by-wire system in which a regenerative cooperative control combining a regenerative braking and a hydraulic braking is performed.

The brake system 1 of this vehicle V is described in the following with reference to FIG. 2. The brake system 1 consists of a brake-by-wire system that detects the brake pedal operating amount (brake pedal stroke) of the brake pedal 10 by using the stroke sensor 10a (serving as an input amount sensor) and produces a brake fluid pressure according to the detected brake pedal operating amount by using a motor actuated cylinder 13 configured to be actuated by an electric servo motor 12.

Figure 2:
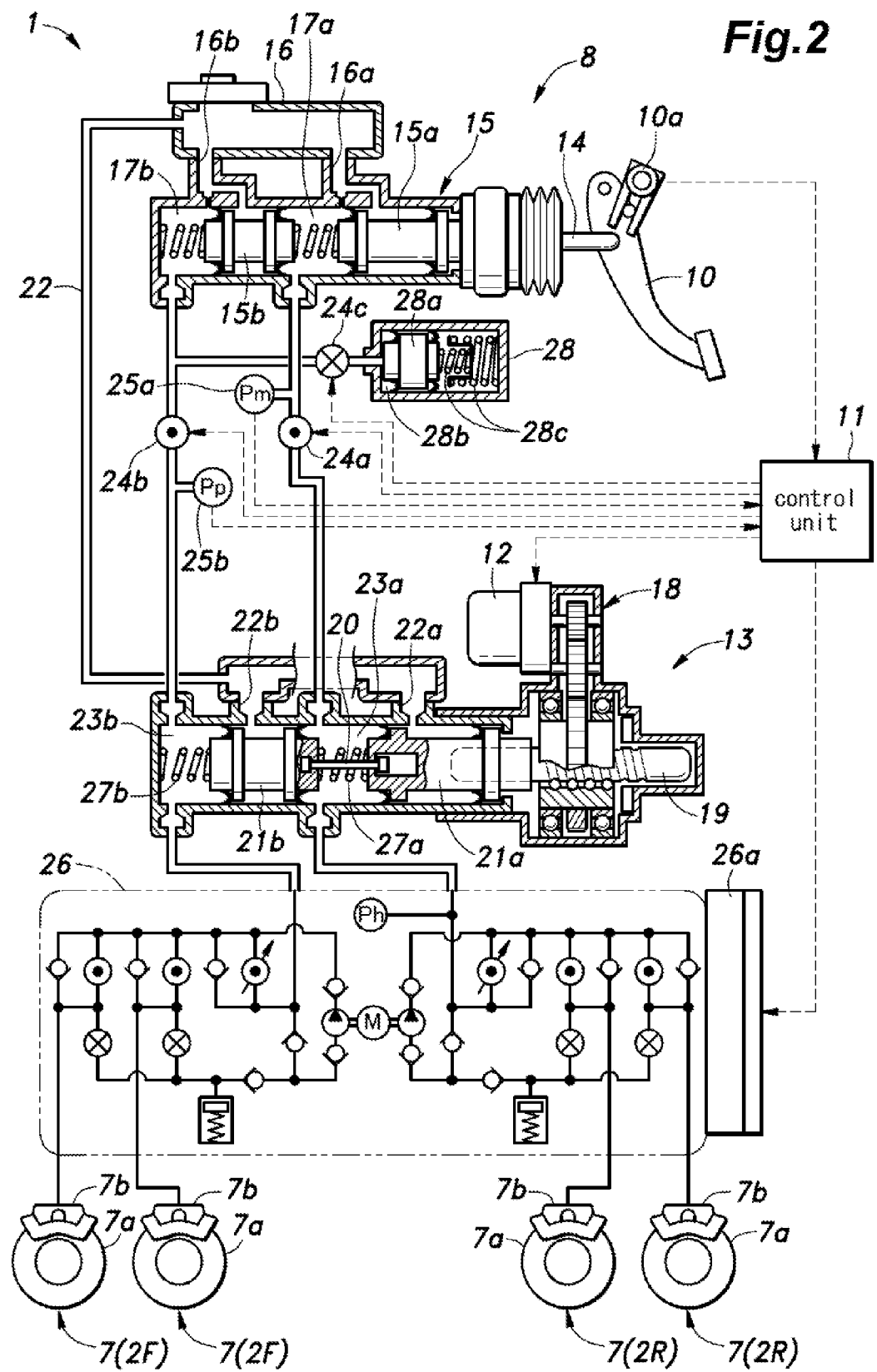
FIG. 2 is a diagram showing the overall structure of the vehicle brake system shown in FIG. 1.

As shown in FIG. 2, an end of a rod 14 is connected to the brake pedal 10 which is in turn pivotally connected to the vehicle body so as to convert the angular movement of the brake pedal 10 into a substantially linear motion of the rod 14, and the other end of the rod 14 engages a first piston 15a of a master cylinder 15 of a tandem type in the direction to force the piston 15a into the master cylinder 15. The master cylinder 15 additionally receives therein a second piston 15b on the side of the first piston 15a facing away from the rod 14, and the first and second pistons 15a and 15b are both resiliently urged toward the rod 14 respectively by a first compression coil spring interposed between the first and second pistons 15a and 15b, and a second compression coil spring interposed between the second piston 15b and the end wall of the master cylinder 15 remote from the open end of the master cylinder 15 into which the rod 14 extends. The brake pedal 10 is also urged by a spring (not shown in the drawing) such that the brake pedal 10 is held at the initial position shown in FIG. 2 by a stopper not shown in the drawing when the brake is not being operated.

The master cylinder 15 is provided with a reservoir tank 16 for receiving and feeding the brake fluid depending on the displacement of the two pistons 15a and 15b. The pistons 15a and 15b are each fitted with a seal member to shut oil passages 16a and 16b communicating the interior of the master cylinder 15 with the reservoir tank 16 depending on the positions of the pistons 15a and 15b. Inside the master cylinder 15, a first fluid chamber 17a is defined between the first and second pistons 15a and 15b, and a second fluid chamber 17b is defined on the side of the second piston 15b facing away from the first piston 15a (or between the second piston 15b and the opposing end wall of the master cylinder 15).

In addition to the electric servo motor 12, the motor actuated cylinder 13 is provided with a gear mechanism 18 connected to the electric servo motor 12, a screw rod 19 which is connected to the gear mechanism 18 via a ball screw mechanism for an axial movement, a first piston 21a engaged by the inner end of the screw rod 19, and a second piston 21b which is connected to the first piston 21a coaxially and in tandem.

The second piston 21b is fixedly provided with a connecting member 20 projecting toward the first piston 21a, and the other end of the connecting member 20 is connected to the first piston 21a so as to allow a relative axial movement with respect to the first piston 21a to a certain extent. Thus, the first piston 21a is able to advance (move toward the second piston 21a) independently from the second piston 21b to a certain extent, but is able to pull the second piston 21b back to the initial position via the connecting member 20 when the first piston 21a has fully retreated. Further, the first and second pistons 21a and 21b are both resiliently urged toward the screw rod 19 by respective springs 27a and 27b. In particular, the spring 27a urges the first and second pistons 21a and 21b away from each other, and the spring 27b urges the second piston 21b toward the first piston 21a.

The motor actuated cylinder 13 is provided with oil passages 22a and 22b which in turn communicate with the reservoir tank 16 via a communication passage 22, and the pistons 21a and 21b are fitted with per se known seal members to shut the oil passages 22a and 22b as required. In the motor actuated cylinder 13, a first fluid pressure generating chamber 23a is defined between the first and second pistons 21a and 21b, and a second fluid pressure generating chamber 23b is defined on the side of the second piston 21b facing away from the first piston 21a (or between the second piston 21b and the opposing end wall of the motor actuated cylinder 13).

The first fluid chamber 17a of the master cylinder 15 is communicated with the first fluid pressure generating chamber 23a of the motor actuated cylinder 13 via a normally open solenoid valve 24a, and the second fluid chamber 17b of the master cylinder 15 is communicated with the second fluid pressure generating chamber 23b of the motor actuated cylinder 13 via a normally open solenoid valve 24b. A master cylinder side brake pressure sensor 25a is provided between the first fluid chamber 17a and the solenoid valve 24a, and a motor actuated cylinder side brake pressure sensor 25b is provided between the solenoid valve 24b and the second fluid pressure generating chamber 23b.

A cylinder type simulator 28 is provided on the line between the second fluid chamber 17b and the solenoid valve 24b via a normally closed solenoid valve 24c. The simulator 28 is provided with a cylinder having an interior separated by a piston 28a. A fluid receiving chamber 28b is defined on one side of the piston 28a, and is provided with a port communicating with the solenoid valve 24b, and a compression coil spring 28c is interposed between the opposite side of the piston 28a and the opposing closed axial end of the cylinder of the simulator 28. When the brake pedal 10 is depressed to cause the brake fluid in the second fluid chamber 17b to flow into the fluid receiving chamber 28b while the solenoid valves 24a and 24b are closed and the solenoid valve 24c is open, the biasing force of the compression coil spring 28c is transmitted to the brake pedal 10 so that the vehicle operator is caused to experience a brake pedal reaction from the brake pedal 10 in a similar manner as in the case with the conventional brake system in which the master cylinder and the wheel cylinder are directly connected to each other.

The first fluid pressure generating chamber 23a and second fluid pressure generating chamber 23b of the motor actuated cylinder 13 are communicated with a plurality (four, in the illustrated embodiment) of wheel cylinders 2b via fluid lines provided with a VSA system 26 which may consist of a per se known vehicle behavior stabilization control system configured to control an ABS for preventing the locking of the wheels at the time of braking, a TCS (traction control system) for preventing the slipping of the wheels at the time of acceleration, a yaw moment control unit when cornering, a brake assist system and an automatic brake system for collision prevention and lane keeping in a coordinated manner. For details of such systems, reference should be made to various prior patent publications on such subject matters. The VSA system 26 includes brake actuators including various hydraulic components for a first system for controlling the wheel cylinders 2b of the front wheels 2F and a second system for controlling the wheel cylinders 2b of the rear wheels 2R, and a VSA control unit 26a for controlling these brake actuators.

The overall control of the brake fluid pressure generating unit 8 is performed by the control unit 11. The control unit 11 receives the various detection signals from the stroke sensor 10a, the brake pressure sensors 25a and 25b and other sensors (not shown in the drawings) for detecting the behavior of the vehicle. Based on the detection signal from the stroke sensor 10a, and the detection signals of the various other sensors, the control unit 11 controls the brake fluid pressure generated by the motor actuated cylinder 13 and hence the frictional brake force generated by each of the disk brakes 7. In the case of a hybrid vehicle (or electric vehicle) as is the case with the illustrated embodiment, as the motor/generator 4 provides a regenerative braking, the control unit 11 is configured to control the brake force allocation or control the brake fluid pressure produced by the motor actuated cylinder 13 depending on the extent or magnitude of the regenerative braking.

The mode of control operation during a normal braking is described in the following. FIG. 2 shows the state of the system when the brake pedal 10 is not being operated. The detection value of the stroke sensor 10a is at an initial value (=0), and the control unit 11 does not produce any brake fluid pressure generation signal. At this time, the screw rod 19 of the motor actuated cylinder 13 is in the most retracted position and the two pistons 21a and 21b of the motor actuated cylinder 13 are also in the respective most retracted positions under the spring force of the return springs 27a and 27b so that brake fluid pressure is produced in none of the fluid pressure generating chambers 23a and 23b.

When the brake pedal 10 is depressed to a certain extent, and the detection value of the stroke sensor 10a has become greater than zero, the brake-by-wire control is performed in such a manner that the two solenoid valves 24a and 24b are closed so as to prevent the fluid pressure generated by the master cylinder 15 to be transmitted to the motor actuated cylinder 13, and the solenoid 24c is opened to cause the fluid pressure generated by the master cylinder 15 to be transmitted to the simulator 28. Based on the input amount detection value (brake pedal operating amount PS) detected by the stroke sensor 10a, the control unit 11 determines a target fluid pressure BPt that takes into account the regenerative braking, and forwards a target current It corresponding to the target fluid pressure BPt to the electric servo motor 12. This in turn causes the screw rod 19 and hence the first piston 21a to be pushed into the cylinder according to this command value, and a brake fluid pressure BP corresponding to the input or the depression stroke (brake pedal operating amount PS) of the brake pedal 10 is generated in the first fluid pressure generating chamber 23a. At the same time, the second piston 21b is displaced forward under the pressure in the first fluid pressure generating chamber 23a against the biasing force of the return spring 27b, and the corresponding brake fluid pressure is generated in the second fluid pressure generating chambers 23b.

In case of a system failure which prevents proper operation of the motor actuated cylinder 13, the normally open solenoid valve 24a and 24b are kept opened while the normally closed solenoid valve 24c is kept closed so that the brake fluid pressure created in the master cylinder 8 may be directly transmitted to the wheel cylinders 7b.

When it is detected that the vehicle operator has displaced the brake pedal 10 in the returning direction (or has released the brake pedal) from the returning stroke of the brake pedal detected by the stroke sensor 10a, the electric servo motor 12 returns the screw rod 19 and hence the first piston 21a towards the initial position such that the brake fluid pressure BP is diminished by an amount corresponding to the returning stroke or the current depression of the brake pedal 10. When the brake pedal 10 is fully returned to the initial position by the return spring not shown in the drawing, the control unit 11 opens the solenoid valves 24a and 24b. As a result, the brake fluid in the wheel cylinders 7b is allowed to return to the reservoir tank 16 via the motor actuated cylinder 13, and the brake force is eliminated. As the detected value of the stroke sensor 11a returns to the initial value, the first piston 21a is caused to return to the initial position, and this in turn causes the second piston 21b to return to the initial position owing to the force transmitted via the connecting member 20. The initial position is set at the time of shipping or at the time of maintenance work at a shop such that the actual brake fluid pressure BPa as detected by the master cylinder side brake pressure sensor 25a is equal to a prescribed initial value (such as 0 MPa).

When the normal brake control is performed while the VSA system 26 is not activated, the brake fluid pressure generated by the motor actuated cylinder 13 is evenly supplied to the wheel cylinders 7b of the front and rear wheels via the VSA system 26. When the VSA system 26 is performing the brake force distributing control, the brake force of each wheel is individually controlled as commanded by the VSA control unit 26a.

When the regenerative braking is being performed, the control unit 11 causes the motor/generator 4 to operate as a generator such that the amount of the regenerative braking corresponding to the brake pedal operating amount given by the stroke PS of the brake pedal 10 is produced. If the level of the vehicle deceleration commanded by the brake pedal operating amount (or by the vehicle operator) cannot be produced by the regenerative braking alone, the electric servo motor 12 actuates the motor actuated cylinder 13, and the coordinated combined braking involving both the regenerative braking and the hydraulic braking is performed. In this embodiment, the target brake fluid pressure can be determined by subtracting the regenerative brake force from the total required brake force which is determined by the brake pedal operating amount or the input amount. Alternatively, the operation amount of the motor actuated cylinder may be selected such that a hydraulic brake force corresponding to a certain ratio to the entire required brake force is produced. According to the present invention, this control action may be performed in a per se known manner as long as the operation of the motor actuated cylinder 13 is performed in association with the depression stroke of the brake pedal 10.

The timing of closing the solenoid valve 24c may be selected as the time point at which the fluid pressure of the second fluid chamber 17b has dropped to an adequately low level to cause the piston 28a to return to the initial position illustrated in FIG. 2 under the biasing force of the compression coil spring 28c. For instance, this timing may be selected as the time point when a prescribed time period has elapsed since the two solenoid valves 24a and 24b are closed. It is also possible to select the timing when the detection value of the brake pressure sensor 25b on the side of the motor actuated cylinder 13 has dropped below or to a prescribed value such as zero.

Figure 3:
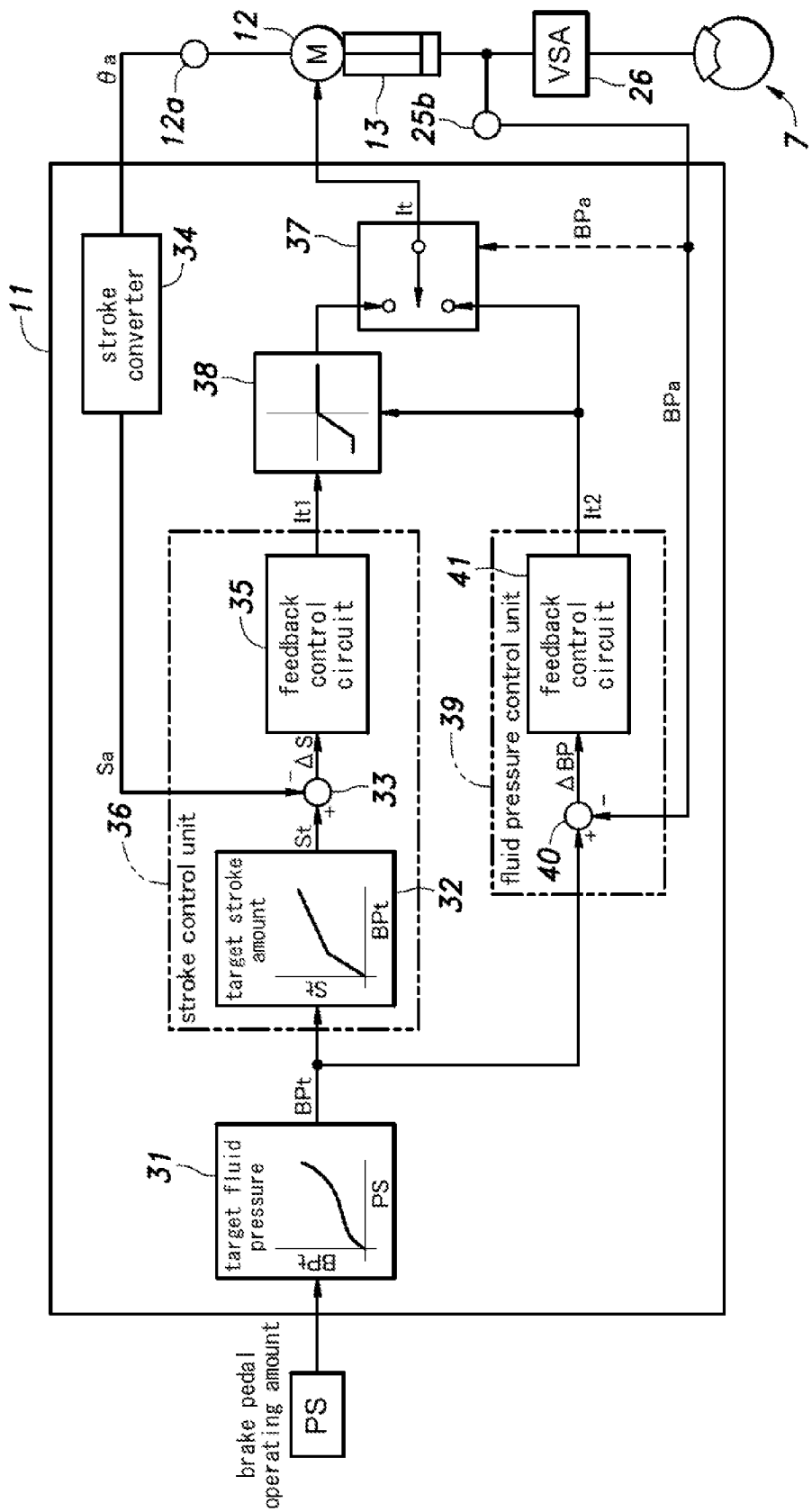
FIG. 3 is a block diagram of the control unit shown in FIG. 1.

The details of the essential part of the control unit 11 used in the illustrated embodiment of the present invention are described in the following with reference to FIG. 3. The brake pedal operating amount PS given by the detection signal from the pedal stroke sensor 10a is supplied to a target fluid pressure setting circuit 31 which sets a target brake fluid pressure BPt corresponding to the brake pedal operating amount PS given by the brake pedal 10 by using a suitable map or mathematical function. The input to the target fluid pressure setting circuit 31 may not be the brake pedal operating amount PS, but may also be any other operation amount (such as the brake fluid pressure obtained from the master cylinder side brake pressure sensor 25a, the pedal depressing force or the like).

The target brake fluid pressure BPt set by the target fluid pressure setting circuit 31 is forwarded to a target stroke amount setting circuit 32 which sets the target stroke amount St of the motor actuated cylinder 13 corresponding to the target brake fluid pressure BPt by using a suitable map or mathematical function. The target stroke amount St set by the target stroke amount setting circuit 32 is forwarded to a subtractor 33 which also receives the detection signal of a rotational angle sensor (such as a rotary encoder) 12a provided on the electric servo motor 12. The rotational angle (actual rotational angle) θa of the electric servo motor 12 detected by the rotational angle sensor 12a is forwarded to a stroke converter 34 to be converted into the actual stroke amount Sa of the motor actuated cylinder 13, and the output of the stroke converter 34 is forwarded to the subtractor 33 as a value to be subtracted from the target stroke amount St. The output of the subtractor 33 is forwarded to a feedback control circuit 35.

The feedback control circuit 35 determines a first target current It1 that is to be supplied to the electric servo motor 12 according to the deviation ΔS of the actual stroke amount Sa from the target stroke amount St. The feedback control circuit 35 may be configured to determine the duty ratio of a PWM control as the first target current It1. The PWM control may consist of a PID control based on the deviation ΔS. The target stroke amount setting circuit 32, the subtractor 33 and the feedback control circuit 35 jointly form a stroke control unit 36 for controlling the drive of the motor actuated cylinder 13 according to the target stroke amount St.

The first target current It1 determined by the feedback control circuit 35 of the stroke control unit 36 is forwarded to a control switch circuit 37 via a limit circuit 38 which will be described hereinafter. When the control switch circuit 37 selects the stroke control, the first target current It1 is forwarded to the electric servo motor 12 via a driver (not shown in the drawings). Thereby, the motor actuated cylinder 13 is caused to operate by an amount corresponding to the target stroke amount St.

The target brake fluid pressure BPt set by the target fluid pressure setting circuit 31 is also forwarded to a subtractor 40 of a fluid pressure control unit 39 which is connected in parallel to the stroke control unit 36. The subtractor 40 receives the detection signal of the motor actuated cylinder side brake pressure sensor 25b or an actual brake fluid pressure BPa as a value to be subtracted from the target brake fluid pressure BPt. The output of the subtractor 40 is forwarded to a feedback control circuit 41.

The feedback control circuit 41 determines a second target current It2 which is to be supplied to the electric servo motor 12 according to the output of the subtractor 40 or the deviation ΔBP of the actual brake fluid pressure BPa from the target brake fluid pressure BPt. The feedback control circuit 41 may be configured to determine the duty ratio of a PWM control as the second target current It2. The PWM control may consist of a PID control based on the deviation ΔBP. The subtractor 40 and the feedback control circuit 41 jointly form the fluid pressure control unit 39 for controlling the drive of the motor actuated cylinder 13 according to the target brake fluid pressure BPt.

The second target current It2 determined by the feedback control circuit 41 of the fluid pressure control unit 39 is forwarded to the control switch circuit 37. When the control switch circuit 37 selects the fluid pressure control, the second target current It2 is forwarded to the electric servo motor 12 via the driver. Thereby, the motor actuated cylinder 13 is caused to operate by an amount which is required to cause the motor actuated cylinder 13 to produce the target fluid pressure BPt.

The control switch circuit 37 receives a control input from the motor actuated cylinder side brake pressure sensor 25b such that the stroke control unit 36 is selected when the actual brake fluid pressure BP detected by the motor actuated cylinder side brake pressure sensor 25b is substantially zero (causing the first target current It1 to be supplied to the electric servo motor 12), and the fluid pressure control unit 39 is otherwise selected (causing the second target current It2 to be supplied to the electric servo motor 12).

In the illustrated embodiment, when the brake pedal 10 is depressed by the vehicle operator, and the brake pedal operating amount PS maintains levels that are not zero (brake pedal depressing operation), the control switch circuit 37 selects the second target current It2 as the target current It. When the brake pedal 10 is released (brake pedal releasing operation), and the brake pedal operating amount PS has been reduced to substantially zero, or more specifically when the actual brake fluid pressure BPa has reached the initial value (such as 0 MPa), the control switch circuit 37 selects the first target current It1 as the target current It. In other words, the target current It is changed from the second target current It2 to the first target current It1, and the control mode is changed from the fluid pressure control by the fluid pressure control unit 39 to the stroke control by the stroke control unit 36.

In the illustrated embodiment, normally, the stroke control is performed only at the time of the brake pedal releasing operation, and is effective only in bringing the actual stroke of the motor actuated cylinder 13 from a certain positive value to a substantially zero level. In other words, a drive current produced by the stroke control is normally negative in sign. In the illustrated embodiment, the limit circuit 38 limits the output of the feedback control unit to a negative value having a limited absolute value. The limit of the absolute value imposed by the limit circuit 38 may consist of any prescribed small value which prevents the motor 12 from producing noises that could be annoying to the vehicle occupant. In the illustrated embodiment, the limit of the absolute value is selected to be equal to the absolute value of the second target current It2 at the time of switching the control mode from the fluid pressure control to the stroke control.

In the stroke control mode, the target current It which is limited by the limit circuit 38 is supplied to the electric servo motor 12 via the driver as discussed earlier. Therefore, even when the actual stroke amount Sa of the motor actuated cylinder 13 has not yet returned to the initial value following the returning of the actual brake fluid pressure BPa to the initial value as a result of the brake pedal releasing operation by the vehicle operator owing to the hysteresis property of the target brake fluid pressure BPt, the switching of the control mode to the stroke control by the stroke control unit 36 ensures the actual stroke amount Sa of the motor actuated cylinder 13 to promptly return to the initial value.

The mode of operation of this control unit 11 according to the present invention is described in the following with reference to FIGS. 4A through 5E. FIGS. 4A-4E show time charts illustrating the mode of operation of the brake system without the limit circuit 38, and FIGS. 5A-5E show a time chart illustrating the mode of operation of the brake system with the limit circuit 38. In these figures, there is no difference in the brake pedal operating amount PS as shown in FIGS. 4A and 5A, and the brake fluid pressure BP shown in FIGS. 4B and 5B.

Referring to FIGS. 4A-4E showing the case where no limit circuit is used, when the brake pedal 10 is depressed by the vehicle operator as shown in FIG. 4A, the fluid pressure control by the fluid pressure control unit 39 is selected by the control switch circuit 37. When the brake pedal 10 is released from this condition, the target brake fluid pressure BPt set by the target fluid pressure setting circuit 31 drops as shown in FIG. 4B on the one hand, and the target current It (consisting of the second target current It2 set by the fluid pressure control unit 39 which is selected at this time) changes to a negative value so as to reduce the stroke amount of the motor actuated cylinder 13 as shown in FIG. 4C. This in turn causes the rotational speed of the electric servo motor 12 to be a negative value as shown in FIG. 4D. As a result, the actual stroke amount Sa of the motor actuated cylinder 13 is reduced as shown in FIG. 4E, and the actual brake fluid pressure BPa drops in a delayed response to the target brake fluid pressure BPt as shown in FIG. 4B.

Once the brake pedal operating amount PS reaches the initial value (=0) as shown in FIG. 1A, the target brake fluid pressure BPt also reaches the initial value (=0 MPa) which is followed by the reduction of the actual brake fluid pressure BPa with some time delay. However, owing to the mechanical hysteresis that may exist in the output of the motor actuated cylinder 13 owing to the difference in the frictional resistance between the extending and retracting strokes of the cylinder, and the hysteresis property given to the target brake fluid pressure BPt, the actual stroke amount Sa of the motor actuated cylinder 13 does not return to the initial value even after the actual brake fluid pressure BPa has reached the initial value as shown in FIG. 4E.

Upon the actual brake fluid pressure BPa reaching the initial value at time t1, the control switch circuit 37 switches the control mode from the fluid pressure control by the fluid pressure control unit 39 to the stroke control by the stroke control unit 36, the target current It shown in FIG. 4C is changed from the second target current It2 to the first target current It1 so that the absolute value of the target current It undergoes a sudden change in an effort to reduce the actual stroke amount Sa to the initial value. As a result, the rotational speed (absolute value thereof) of the electric servo motor abruptly increases as shown in FIG. 4D causing an increase in the noises generated by the servo motor 12 when the brake pedal operating amount PS has reached the initial value with some delay, and this may cause discomfort to the vehicle operator.

On the other hand, according to the brake system 1 shown in FIGS. 5A-5E, at the time t1 when the control mode is switched from the fluid pressure control to the stroke control, the target current It shown in FIG. 5C is switched from the value of the second target current It2 to the value of the first target current It1 as shown in FIG. 5C, but the limit circuit 38 limits the value of the target current It to the value of the second target current It2 at the time of switching (t1), and the absolute value of the target current It is prevented from increasing beyond this limit. As a result, the rotational speed (absolute value) of the electric servo motor 12 is prevented from increasing so that the noises from the electric servo motor 12 are prevented from increasing following the time point when the brake pedal operating amount PS has reached the initial value as shown in FIG. 5A.

As discussed above, when the control mode is changed from the fluid pressure control by the fluid pressure control unit 39 to the stroke control by the stroke control unit 36, because the limit circuit 38 limits the value of the target current It consisting of the first target current It1, the noises from the electric servo motor 12 is prevented from sharply increasing when the control mode is changed.

In this embodiment, the target current It set to the value of the first target current It1 is limited by the limit circuit for a time period T longer than the time period required for the actual stroke amount Sa to reach the initial value from the time point of switching the control mode so that the target current is limited until the actual stroke amount Sa returns to the initial value (=0), and the noises from the electric servo motor 12 is effectively prevented from increasing sharply at the time of switching the control mode.

Because the limit circuit 38 limits the target current It to the value of the second target current It2 at the time point t1 of switching the control mode by the control switch circuit 37, the target current It is prevented from increasing due to the change in the control mode following the brake pedal releasing operation so that the sharp increase in the noises of the electric servo motor 12 at the time of changing the control mode can be avoided.

In the illustrated embodiment, the limit circuit 38 is in effect for the whole duration of the stroke control mode. However, the limiting action is required only for a short time period, and may also be configured to be in effect only for a prescribed time period T as shown in FIG. 5C. The time period T may be selected to be substantially equal to a time period which is required for the actual stroke of the motor actuated fluid pressure source to be reduced to substantially zero from the time when the actual brake fluid pressure has dropped to a substantially zero level.

In the illustrated embodiment, the stroke control was selected only when the actual brake fluid pressure BPa is substantially zero, but the present invention is not limited to this example, but may also be applicable to cases where the stroke control is additionally selected in other situations. The brake is typically operated by depressing a brake pedal, but the present invention should be considered as being equally applicable to cases where the brake is operated by moving a grip, a knob or any other operating member.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of the prior art references mentioned in this application are incorporated in this application by reference.

The invention claimed is:

1. A vehicle brake system, comprising:
 a power actuated fluid pressure source configured to produce a brake fluid pressure according to an operating stroke thereof;
 a power source for actuating the fluid pressure source;
 a brake unit actuated by the brake fluid pressure produced by the power actuated fluid pressure source;
 a stroke sensor for detecting the actual operating stroke of the power actuated fluid pressure source;
 a brake fluid pressure sensor for detecting an actual brake fluid pressure supplied to the brake unit;
 a brake pedal sensor for detecting a pedal stroke of the brake pedal;
 a target brake fluid pressure setting unit for setting a target brake fluid pressure according to the pedal stroke detected by the brake pedal sensor;
 a stroke control unit for setting a target operating stroke of the power actuated fluid pressure source for the given target brake fluid pressure, and controlling the power source for actuating the fluid pressure source according to a deviation of the actual operating stroke of the power actuated fluid pressure source from the target operating stroke thereof;
 a fluid pressure control unit for controlling the power source for actuating the power actuated fluid pressure source according to a deviation of the actual brake fluid pressure detected by the brake fluid pressure sensor from the target brake fluid pressure set by the target brake fluid pressure setting unit; and a control switch unit that selects the stroke control unit when the brake pedal is released and selects the fluid pressure control unit when the brake pedal is depressed.

2. The vehicle brake system according to claim 1, wherein the releasing of the brake pedal is detected when the actual brake fluid pressure has dropped to a substantially zero level.

3. The vehicle brake system according to claim 1, wherein the control switch unit switches from the stroke control unit back to the fluid pressure control unit when the actual stroke of the power actuated fluid pressure source has become substantially greater than zero.

4. The vehicle brake system according to claim 1, wherein the power source consists of an electric motor, and the power supplied to the electric motor is measured by a level of electric power or a duty ratio of electric power supplied to the electric motor.

5. A vehicle brake system comprising:
 a power actuated fluid pressure source configured to produce a brake fluid pressure according to an operating stroke thereof;
 a power source for actuating the fluid pressure source;
 a brake unit actuated by the brake fluid pressure produced by the power actuated fluid pressure source;
 a stroke sensor for detecting the actual operating stroke of the power actuated fluid pressure source;
 a brake fluid pressure sensor for detecting an actual brake fluid pressure supplied to the brake unit;
 a brake pedal sensor for detecting a pedal stroke of the brake pedal;
 a target brake fluid pressure setting unit for setting a target brake fluid pressure according to the pedal stroke detected by the brake pedal sensor;
 a stroke control unit for setting a target operating stroke of the power actuated fluid pressure source for the given target brake fluid pressure, and controlling the power source for actuating the fluid pressure source according to a deviation of the actual operating stroke of the power actuated fluid pressure source from the target operating stroke thereof;
 a fluid pressure control unit for controlling the power source for actuating the power actuated fluid pressure source according to a deviation of the actual brake fluid pressure detected by the brake fluid pressure sensor from the target brake fluid pressure set by the target brake fluid pressure setting unit;
 a control switch unit that selects the stroke unit when the brake pedal is released and selects the fluid pressure control unit when the brake pedal is depressed; and
 a limit circuit for limiting power supplied by the power source at least for a certain time period following the releasing of the brake pedal.

6. The vehicle brake system according to claim 5, wherein the limit circuit limits an upper limit of an absolute value of power supplied by the power source when the power supplied by the power source is negative in sign.

7. The vehicle brake system according to claim 5, wherein the limit circuit is configured to limit power supplied by the power source until the actual operating stroke of the power actuated fluid pressure source has substantially dropped to zero.

8. The vehicle brake system according to claim 5, wherein the limit circuit limits the power supplied by the power source to a level of power that was supplied by the power source under a control of the fluid pressure control unit immediately before the control switch unit selected the stroke control unit instead of the fluid pressure control unit.

\* \* \* \* \*